(12) United States Patent
Seno et al.

(10) Patent No.: US 12,552,875 B2
(45) Date of Patent: Feb. 17, 2026

(54) ANTI-HUMAN CRIPTO-1 ANTIBODY

(71) Applicants: GSP ENTERPRISE, INC., Osaka (JP);
Tomoike Bio Ltd., Hong Kong (CN);
A BIOTECH CO., LTD., Seoul (KR)

(72) Inventors: Masaharu Seno, Okayama (JP);
Atsushi Takayanagi, Osaka (JP);
Sekyoung Lee, Seoul (KR)

(73) Assignees: GSP ENTERPRISE, INC., Osaka (JP);
TOMOIKE BIO LTD., Hong Kong (CN); A BIOTECH CO., LTD., Seoul (KR)

( * ) Notice: Subject to any disclaimer, the term of this patent is extended or adjusted under 35 U.S.C. 154(b) by 892 days.

(21) Appl. No.: 17/775,706

(22) PCT Filed: Nov. 10, 2020

(86) PCT No.: PCT/JP2020/041801
§ 371 (c)(1),
(2) Date: May 10, 2022

(87) PCT Pub. No.: WO2021/095703
PCT Pub. Date: May 20, 2021

(65) Prior Publication Data
US 2022/0363777 A1    Nov. 17, 2022

(30) Foreign Application Priority Data

Nov. 11, 2019  (JP) ................................ 2019-204019

(51) Int. Cl.
*C07K 16/30* (2006.01)
*A23L 33/175* (2016.01)
*A61P 35/00* (2006.01)

(52) U.S. Cl.
CPC ............ *C07K 16/30* (2013.01); *A23L 33/175* (2016.08); *A61P 35/00* (2018.01); *A23V 2002/00* (2013.01); *C07K 2317/21* (2013.01); *C07K 2317/565* (2013.01); *C07K 2317/732* (2013.01); *C07K 2317/734* (2013.01)

(58) Field of Classification Search
CPC ................... C07K 2317/565; A61K 2039/505
See application file for complete search history.

(56) References Cited

U.S. PATENT DOCUMENTS

| 2005/0255117 | A1 | 11/2005 | Sanicola-Nadel et al. |
| 2010/0008906 | A1 | 1/2010 | Glaser et al. |
| 2017/0355756 | A1* | 12/2017 | Julien ............... C07K 16/18 |

FOREIGN PATENT DOCUMENTS

| CN | 101137673 | 3/2008 |
| JP | 2005-520556 | 7/2005 |
| JP | 2018-506966 | 3/2018 |
| JP | 2019-506842 | 3/2019 |
| WO | 03/080862 | 10/2003 |
| WO | WO-2008068048 A2 * | 6/2008 ............ A61P 31/10 |
| WO | 2016/123019 | 8/2016 |
| WO | 2017/096120 | 6/2017 |
| WO | 2017/192589 | 11/2017 |
| WO | 2018/044970 | 3/2018 |
| WO | 2018/057967 | 3/2018 |
| WO | 02/077033 | 10/2022 |

OTHER PUBLICATIONS

Klauzinska M et al. Cripto-1: an extracellular protein-connecting the sequestered biological dots. Connect Tissue Res. 2015;56(5): 364-80. (Year: 2015).*
Almagro JC, Fransson J. Humanization of antibodies. Front Biosci. Jan. 1, 2008;13:1619-33. (Year: 2008).*
Chen et al., Enhancement and destruction of antibody function by somatic mutation: unequal occurrence is controlled by V gene combinatorial associations. EMBO J. Jun. 15, 1995;14(12):2784-94. (Year: 1995).*
Koenig et al. Mutational landscape of antibody variable domains reveals a switch modulating the interdomain conformational dynamics and antigen binding. PNAS Jan. 24, 2017 114(4)E486-E495;f irstpublished Jan. 5, 2017. (Year: 2017).*
Edwards et al. The remarkable flexibility of the human antibody repertoire;isolation of over one thousand different antibodies to a single protein, BLyS. J Mol Biol Nov. 14, 2003;334(1):103-18. (Year: 2003).*
Kussie et al. A single engineered amino acid substitution changes antibody fine specificity.J Immunol. Jan. 1, 1994;152(1):146-52. (Year: 1994).*
Office Action issued May 25, 2023 in corresponding CN patent application No. 202080078246.4, with English translation, 17 pages.
International Search Report issued Jan. 19, 2021 in International (PCT) Application No. PCT/JP2020/041801.
Foca, Giuseppina et al., "Development of conformational antibodies targeting Cripto-1 with neutralizing effects in vitro", Biochime, 2019, vol. 158, pp. 246-256.
Lonardo, Enza et al., "Nodal/Activin Signaling Drives Self-Renewal and Tumorigenicity of Pancreatic Cancer Stem Cells and Provides a Target for Combined Drug Therapy", Cell Stem Cell, 2011, vol. 9, No. 5, pp. 433-446.
Gong, Yuehua et al., "Nodal Promotes the Self-Renewal of Human Colon Cancer Stem Cells via an Autocrine Manner through Smad2/3 Signaling Pathway", Biomed Research International, 2014, vol. 2014, Article ID 364134, 11 pages.
Donovan, Prudence et al., "Paracrine Activin-A Signaling Promotes Melanoma Growth and Metastasis through Immune Evasion", Journal of Investigative Dermatology, 2017, vol. 137, No. 12, pp. 2578-2587.

(Continued)

Primary Examiner — Aurora M Fontainhas
Assistant Examiner — Jennifer A Benavides
(74) Attorney, Agent, or Firm — Wenderoth, Lind & Ponack, L.L.P.

(57) ABSTRACT

An object of the present invention is to develop a technique of reducing cancer stem cells. The solution is to provide a human-derived anti-human Cripto-1 antibody containing specific amino acid sequences.

13 Claims, 7 Drawing Sheets
Specification includes a Sequence Listing.

(56) References Cited

OTHER PUBLICATIONS

Dermawan, Josephine Kam Tai et al., "Pharmacological Targeting of the Histone Chaperone Complex FACT Preferentially Eliminates Glioblastoma Stem Cells and Prolongs Survival in Preclinical Models", Cancer Research, 2016, vol. 76, No. 8, pp. 2432-2442.

Kimura, Hideharu et al., "Antibody-dependent cellular cytotoxicity of cetuximab against tumor cells with wild-type or mutant epidermal growth factor receptor", Cancer Science, 2007, vol. 98, No. 8, pp. 1275-1280.

Alam, Md Jahangir et al., "Exogenous Cripto-1 Suppresses Self-Renewal of Cancer Stem Cell Model", International Journal of Molecular Sciences, 2018, vol. 19, No. 11, 3345, 18 pages.

Sakai, Keiko et al., "Isolation and Characterization of Phage-Displayed Single Chain Antibodies Recognizing Nonreducing Terminal Mannose Residues: 1. A New Strategy for Generation of Anti-Carbohydrate Antibodies", Biochemistry, 2007, vol. 46, No. 1, pp. 253-262.

Adkins et al., "Antibody blockade of the Cripto CFC domain suppresses tumor cell growth in vivo", The Journal of Clinical Investigation, 2003, vol. 112, No. 4, pp. 575-587, 13 pages.

Bianco et al., "Targeting the embryonic gene Cripto-1 in cancer and beyond", Expert Opinion on Therapeutic Patents, 2010, vol. 20, pp. 1739-1749, 12 pages.

Supplementary European Search Report issued Nov. 8, 2023 in corresponding European Patent Application No. 20888504.6, 13 pages.

\* cited by examiner

SEQUENCE LISTING

<160> NUMBER OF SEQ ID NOS: 24

<210> SEQ ID NO 1
<211> LENGTH: 10
<212> TYPE: PRT
<213> ORGANISM: Homo sapiens

<400> SEQUENCE: 1

Gly Asn Ser Val Ser Ser Asn Ser Ala Ala
1               5                   10

<210> SEQ ID NO 2
<211> LENGTH: 10
<212> TYPE: PRT
<213> ORGANISM: Homo sapiens

<400> SEQUENCE: 2

Ser Val Ser Ser Asn Ser Ala Ala Trp Asn
1               5                   10

<210> SEQ ID NO 3
<211> LENGTH: 9
<212> TYPE: PRT
<213> ORGANISM: Homo sapiens

<400> SEQUENCE: 3

Thr Tyr Tyr Arg Ser Lys Trp Tyr Asn
1               5

<210> SEQ ID NO 4
<211> LENGTH: 7
<212> TYPE: PRT
<213> ORGANISM: Homo sapiens

<400> SEQUENCE: 4

Tyr Arg Ser Lys Trp Tyr Asn
1               5

<210> SEQ ID NO 5
<211> LENGTH: 15
<212> TYPE: PRT
<213> ORGANISM: Homo sapiens

<400> SEQUENCE: 5

Ala Arg Gly Phe Cys Ser Gly Gly Arg Cys Tyr Ser Phe Asp Tyr
1               5                   10                  15

<210> SEQ ID NO 6
<211> LENGTH: 134
<212> TYPE: PRT
<213> ORGANISM: Homo sapiens

<400> SEQUENCE: 6

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asn Ser Val Ser Ser Asn
            20                  25                  30

Ser Ala Ala Trp Asn Trp Ile Arg Arg Ser Pro Ser Arg Gly Leu Glu
        35                  40                  45

Trp Leu Gly Arg Thr Tyr Tyr Arg Ser Lys Trp Tyr Asn Asp Tyr Ala
    50                  55                  60

Val Ser Val Lys Ser Arg Ile Thr Ile Lys Pro Asp Thr Ser Lys Asn
65                  70                  75                  80

```
Gln Phe Ser Leu Gln Leu Asn Ser Val Thr Pro Glu Asp Thr Ala Met
                85                  90                  95

Tyr Tyr Cys Ala Arg Gly Phe Cys Ser Gly Arg Cys Tyr Ser Phe
           100                 105                 110

Asp Tyr Trp Gly Pro Gly Thr Leu Val Thr Val Ser Ser Gly Ser Ala
       115                 120                 125

Ser Ala Pro Thr Ala Ser
       130

<210> SEQ ID NO 7
<211> LENGTH: 9
<212> TYPE: PRT
<213> ORGANISM: Homo sapiens

<400> SEQUENCE: 7

Asp Ser Asp Val Gly Ala Tyr Gly Ser
1               5

<210> SEQ ID NO 8
<211> LENGTH: 3
<212> TYPE: PRT
<213> ORGANISM: Homo sapiens

<400> SEQUENCE: 8

Asp Val Thr
1

<210> SEQ ID NO 9
<211> LENGTH: 11
<212> TYPE: PRT
<213> ORGANISM: Homo sapiens

<400> SEQUENCE: 9

Gln Ala Trp Asp Ser Gly Ile His Val Val Phe
1               5                   10

<210> SEQ ID NO 10
<211> LENGTH: 111
<212> TYPE: PRT
<213> ORGANISM: Homo sapiens

<400> SEQUENCE: 10

Gln Ser Val Leu Thr Gln Pro Ala Ser Val Ser Gly Ser Pro Gly Gln
1               5                   10                  15

Ser Ile Thr Ile Ser Cys Thr Gly Thr Asp Ser Asp Val Gly Ala Tyr
            20                  25                  30

Gly Ser Ala Ser Trp Tyr Arg His Ser Pro Gly Lys Ala Pro Gln Leu
        35                  40                  45

Ile Ile Tyr Asp Val Thr Asn Arg Pro Ser Gly Val Ser Asn Arg Phe
    50                  55                  60

Tyr Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Gln Ala Trp Asp Ser Gly
                85                  90                  95

Ile His Val Val Phe Gly Gly Gly Thr Gln Leu Thr Val Leu Gly
            100                 105                 110

<210> SEQ ID NO 11
<211> LENGTH: 120
<212> TYPE: PRT
```

<213> ORGANISM: Homo sapiens

<400> SEQUENCE: 11

Arg Gly Tyr Leu Ala Phe Arg Asp Asp Ser Ile Trp Pro Gln Glu Glu
1               5                   10                  15

Pro Ala Ile Arg Pro Arg Ser Ser Gln Arg Val Pro Pro Met Gly Ile
            20                  25                  30

Gln His Ser Lys Glu Leu Asn Arg Thr Cys Cys Leu Asn Gly Gly Thr
        35                  40                  45

Cys Met Leu Gly Ser Phe Cys Ala Cys Pro Pro Ser Phe Tyr Gly Arg
    50                  55                  60

Asn Cys Glu His Asp Val Arg Lys Glu Asn Cys Gly Ser Val Pro His
65                  70                  75                  80

Asp Thr Trp Leu Pro Lys Lys Cys Ser Leu Cys Lys Cys Trp His Gly
                85                  90                  95

Gln Leu Arg Cys Phe Pro Gln Ala Phe Leu Pro Gly Cys Asp Gly Leu
            100                 105                 110

Val Met Asp Glu His Leu Val Ala
            115                 120

<210> SEQ ID NO 12
<211> LENGTH: 24
<212> TYPE: PRT
<213> ORGANISM: Artificial Sequence
<220> FEATURE:
<223> OTHER INFORMATION: JHis

<400> SEQUENCE: 12

Met Gly Ser Ser His His His His His His Ser Ser Gly Leu Val Pro
1               5                   10                  15

Arg Gly Ser His Met Arg Pro Ser
            20

<210> SEQ ID NO 13
<211> LENGTH: 22
<212> TYPE: DNA
<213> ORGANISM: Artificial Sequence
<220> FEATURE:
<223> OTHER INFORMATION: Primer

<400> SEQUENCE: 13
caacgaccac tttgtcaagc tc                                        22

<210> SEQ ID NO 14
<211> LENGTH: 22
<212> TYPE: DNA
<213> ORGANISM: Artificial Sequence
<220> FEATURE:
<223> OTHER INFORMATION: Primer

<400> SEQUENCE: 14
ggtctacatg gcaactgtga gg                                        22

<210> SEQ ID NO 15
<211> LENGTH: 26
<212> TYPE: DNA
<213> ORGANISM: Artificial Sequence
<220> FEATURE:
<223> OTHER INFORMATION: Primer

<400> SEQUENCE: 15
gggaaatggg agggtgcaa aagagg                                     26

<210> SEQ ID NO 16
<211> LENGTH: 26
<212> TYPE: DNA
<213> ORGANISM: Artificial Sequence
<220> FEATURE:
<223> OTHER INFORMATION: Primer

<400> SEQUENCE: 16
ttgcgtgagt gtggatggga ttggtg                                        26

<210> SEQ ID NO 17
<211> LENGTH: 26
<212> TYPE: DNA
<213> ORGANISM: Artificial Sequence
<220> FEATURE:
<223> OTHER INFORMATION: Primer

<400> SEQUENCE: 17
gcgtcctggg aagggagatc cggagc                                        26

<210> SEQ ID NO 18
<211> LENGTH: 27
<212> TYPE: DNA
<213> ORGANISM: Artificial Sequence
<220> FEATURE:
<223> OTHER INFORMATION: Primer

<400> SEQUENCE: 18
ttgagggcat cgtcgcgcgg gaggctg                                       27

<210> SEQ ID NO 19
<211> LENGTH: 24
<212> TYPE: DNA
<213> ORGANISM: Artificial Sequence
<220> FEATURE:
<223> OTHER INFORMATION: Primer

<400> SEQUENCE: 19
gacaggggga ggggaggagc tagg                                          24

<210> SEQ ID NO 20
<211> LENGTH: 26
<212> TYPE: DNA
<213> ORGANISM: Artificial Sequence
<220> FEATURE:
<223> OTHER INFORMATION: Primer

<400> SEQUENCE: 20
cttccctcca accagttgcc ccaaac                                        26

<210> SEQ ID NO 21
<211> LENGTH: 20
<212> TYPE: DNA
<213> ORGANISM: Artificial Sequence
<220> FEATURE:
<223> OTHER INFORMATION: Primer

<400> SEQUENCE: 21
atgctcaccc caccttcttc                                               20

<210> SEQ ID NO 22
<211> LENGTH: 20
<212> TYPE: DNA
<213> ORGANISM: Artificial Sequence
<220> FEATURE:

```
-continued

<223> OTHER INFORMATION: Primer

<400> SEQUENCE: 22
ttctcacctg tgtgggttcg                                               20

<210> SEQ ID NO 23
<211> LENGTH: 25
<212> TYPE: DNA
<213> ORGANISM: Artificial Sequence
<220> FEATURE:
<223> OTHER INFORMATION: Primer

<400> SEQUENCE: 23
cagccccgat tcttccacca gtccc                                         25

<210> SEQ ID NO 24
<211> LENGTH: 25
<212> TYPE: DNA
<213> ORGANISM: Artificial Sequence
<220> FEATURE:
<223> OTHER INFORMATION: Primer

<400> SEQUENCE: 24
cggaagattc ccagtcgggt tcacc                                         25
```

ANTI-HUMAN CRIPTO-1 ANTIBODY

INCORPORATION BY REFERENCE OF SEQUENCE LISTING

A sequence listing in electronic (ASCII plain text file) format is filed with this application and incorporated herein by reference. The name of the ASCII plain text file is "AttachE-SequenceListing-0197.txt"; the file was created on Sep. 26, 2025; the size of the file is 7,255 bytes.

TECHNICAL FIELD

The present invention relates to, for example, a monoclonal antibody that specifically recognizes the structure of the extracellular domain of human Cripto-1. The present invention also relates to, for example, a food or beverage composition or pharmaceutical composition containing a monoclonal antibody that specifically recognizes the structure of the extracellular domain of human Cripto-1.

BACKGROUND ART

Recent cancer research has revealed that cancer tissues are not a cell assembly of homogeneous nature, and are rather an assembly of cells with inhomogeneous nature. Additionally, it is known that cancer tissues contain cancer stem cells, and that while cancer cells are differentiated from cancer stem cells, the cancer stem cells themselves also proliferate.

As evidenced by the fact that therapeutic effects of existing cancer drugs are even indicated by "five-year survival rate," the permanent curing of cancer is generally perceived as being difficult in reality. Apparently, existing cancer drugs, including molecularly targeted drugs, are unlikely to cure cancer because these drugs only work on specific cancer cells within a cell population present in a cancer tissue, and do not work on the remaining cancer cells or cancer stem cells showing heterogeneity.

Cripto-1 (CR-1) is a known co-receptor for Nodal necessary for self-replication of cancer stem cells (NPL 1 to 3). Anti-Nodal antibodies or anti-TGF-β receptor antibodies are thought to be effective in inhibiting the growth of cancer stem cells. Antibodies against human Cripto are also known (PTL 1).

CITATION LIST

Patent Literature

PTL 1: JP2005-520556

Non-Patent Literature

NPL 1: Gong et al. Cell Stem Cell. (2011) 9 (5): 433-446
NPL 2: Guo et al. Biomed Res Int. (2014) 2014:364134
NPL 3: Donovan et al. J Invest Dermatol. (2017) 137 (12): 2578-2587
NPL 4: Josephine et al. Cancer Res (2016) 76 (8)

SUMMARY OF INVENTION

Technical Problem

Inhibiting the proliferation of cancer stem cells is effective in treating cancer, and anti-Nodal antibodies or anti-TGF-β receptor antibodies are thought to be effective in inhibiting the proliferation of cancer stem cells. However, the Nodal or TGF-β receptors are molecules widely involved in life phenomena other than cancer stem cells, and antibodies binding to these receptors may cause serious side effects. Additionally, because of the difficulty in preparing Nodal or TGF-β receptors, antigens for producing anti-Nodal antibodies or anti-TGF-β receptor antibodies are not readily available.

Solution to Problem

To address the problems above, the present inventors conducted extensive research and produced a human-derived anti-human Cripto-1 antibody that has excellent affinity for human Cripto-1.

The present invention was completed on the basis of this finding and broadly includes the subject matter in the following embodiments.

I. Antibody

I-1. A human-derived anti-human Cripto-1 monoclonal antibody that specifically recognizes the extracellular domain of human Cripto-1, the antibody comprising at least one CDR selected from the group consisting of a heavy-chain CDR 1, a heavy-chain CDR 2, a light-chain CDR 1, and a light-chain CDR 2, wherein
the heavy-chain CDR 1 contains any one of the following amino acid sequences:
(A) the amino acid sequence represented by SEQ ID NO: 1,
(B) an amino acid sequence formed by substituting, deleting, or adding 1 to 3 amino acid residues in the amino acid sequence (A),
(C) the amino acid sequence represented by SEQ ID NO: 2, and
(D) an amino acid sequence formed by substituting, deleting, or adding 1 to 3 amino acid residues in the amino acid sequence (C),
the heavy-chain CDR 2 contains any one of the following amino acid sequences:
(E) the amino acid sequence represented by SEQ ID NO: 3, or
(F) an amino acid sequence formed by substituting, deleting, or adding 1 to 3 amino acid residues in the amino acid sequence (E),
(G) the amino acid sequence represented by SEQ ID NO: 4, and
(H) an amino acid sequence formed by substituting, deleting, or adding 1 to 3 amino acid residues in the amino acid sequence (G),
the light-chain CDR 1 contains
(I) the amino acid sequence represented by SEQ ID NO: 7, or
(J) an amino acid sequence formed by substituting, deleting, or adding 1 to 3 amino acid residues in the amino acid sequence (I), and
the light-chain CDR 2 contains
(K) the amino acid sequence represented by SEQ ID NO: 8, or
(L) an amino acid sequence formed by substituting, deleting, or adding 1 to 3 amino acid residues in the amino acid sequence (K).

I-2. The antibody according to I-1, comprising the heavy-chain CDR 1 and the heavy-chain CDR 2 and/or the light-chain CDR 1 and the light-chain CDR 2.

I-3. The antibody according to I-1 or I-2, comprising
a heavy-chain CDR 3 containing
(M) the amino acid sequence represented by SEQ ID NO: 5, or
(N) an amino acid sequence formed by substituting, deleting, or adding 1 to 3 amino acid residues in the amino acid sequence (M); and/or
a light-chain CDR 3 containing
(O) the amino acid sequence represented by SEQ ID NO: 9, or
(P) an amino acid sequence formed by substituting, deleting, or adding 1 to 3 amino acid residues in the amino acid sequence (O).

I-4. The antibody according to any one of I-1 to 1-3, comprising
a heavy-chain variable region containing
(Q) the amino acid sequence represented by SEQ ID NO: 6, or
(R) an amino acid sequence formed by substituting, deleting, or adding 1 to 50 amino acid residues in the amino acid sequence (Q); and/or
a light-chain variable region containing
(S) the amino acid sequence represented by SEQ ID NO: 10, or
(T) an amino acid sequence formed by substituting, deleting, or adding 1 to 50 amino acid residues in the amino acid sequence(S).

I-5. The antibody according to any one of I-1 to I-4, having a structure of Fv, scfv, diabody, triabody, tetrabody, or a combination thereof.

I-6. The antibody according to any one of I-1 to 1-5, comprising a constant region.

I-7. The antibody according to any one of I-1 to I-6, having a structure of an immunoglobulin, Fab, F(ab')$_2$, minibody, scfv-Fc, or a combination thereof.

I-8. The antibody according to any one of I-1 to 1-7, having cytotoxic activity.

I-9. The antibody according to I-8, wherein the cytotoxic activity is ADCC, CDC, or ADCP activity.

I-10. The antibody according to any one of I-1 to I-9, which is a multispecific antibody.

I-11. The antibody according to any one of I-1 to I-10, to which a cytotoxin is bindable.

II. Polynucleotide
II-1. A polynucleotide encoding the antibody of any one of I-1 to I-11.

III. Cell
III-1. A cell producing the antibody of any one of I-1 to I-11.
III-2. A cell retaining the polynucleotide of II-1.

IV. Food or Beverage Composition
IV-1. A food or beverage composition comprising the antibody of any one of I-1 to I-11.
IV-2. The food or beverage composition according to IV-1, which is for use in inhibiting the proliferation of a cancer stem cell.
IV-3. The food or beverage composition according to IV-1 or IV-2, which is for use in the prevention and/or treatment of cancer.

V. Pharmaceutical Composition
V-1. A pharmaceutical composition comprising the antibody of any one of I-1 to I-11.
V-2. The pharmaceutical composition according to V-1, which is for use in inhibiting the proliferation of a cancer stem cell.
V-3. The pharmaceutical composition according to V-1 or V-2, which is for use in the prevention and/or treatment of cancer.

VI. Method for Prevention and/or Treatment
VI-1. A method for preventing cancer, the method comprising administering the antibody of any one of I-1 to I-11 to a living organism that desires the prevention of developing cancer.
VI-2. A method for treating cancer, the method comprising administering the antibody of any one of I-1 to I-11 to a living organism with cancer.

Advantageous Effects of Invention

The antibody according to the present invention specifically recognizes the extracellular domain of human Cripto-1. Thus, the antibody is useful in inhibiting the self-renewal of cancer stem cells.

Because cancer cells are differentiated from cancer stem cells, cancer can be treated by inhibiting the self-renewal of cancer stem cells. This effect is achieved by blocking the induction of cells into cancer stem cells, from which cancer cells are differentiated, and can therefore be expected to contribute to the curing of cancer. Given this mechanism, the antibody according to the present invention is effective in not allowing cancer cells to develop (i.e., being effective in preventing cancer). In expectation of these effects, the antibody according to the present invention can be used in the fields of food, beverages, and medical drugs.

BRIEF DESCRIPTION OF DRAWINGS

In FIG. 1, VH indicates that the base sequence encoding the heavy-chain variable region is disposed, and VL indicates that the base sequence encoding the light-chain variable region is disposed.

FIG. 4 shows the binding of the #35 clone antibody to pancreas cancer tissue (A), to thyroid cancer tissue (B), to prostate cancer tissue (C), and to stomach cancer tissue (D). The upper part of each of (A) to (D) shows an image of staining with the #35 clone antibody and a secondary antibody, and the lower part shows an image of staining with the secondary antibody only. In (A) to (D), (a) is a superimposition of (b) and (c), (b) is an image of staining with the #35 clone antibody, and (c) is a DAPI-stained image.

FIG. 5 shows the binding of the #35 clone antibody to stomach cancer tissue (A) and (B), and the binding of the #35 clone antibody to cervical cancer tissue (C) and (D). The upper part and the lower part, as well as (a), (b), and (c) of (A) to (D) are the same as those in FIG. 3.

FIG. 6 shows the binding of the #35 clone antibody to cervical cancer tissue (A) and (C), to colorectal cancer tissue (B), and to breast cancer tissue (D). The upper part and the lower part, as well as (a), (b), and (c) of (A) to (D) are the same as those in FIG. 3.

DESCRIPTION OF EMBODIMENTS

Figure 1:
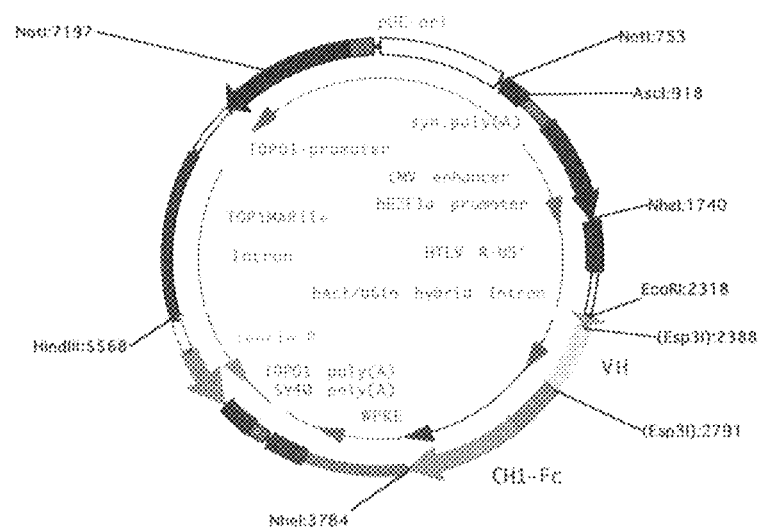
FIG. 1 shows a schematic diagram of expression vectors constructed during the preparation of antibodies of various clones produced in Example 1.
Figure 1:
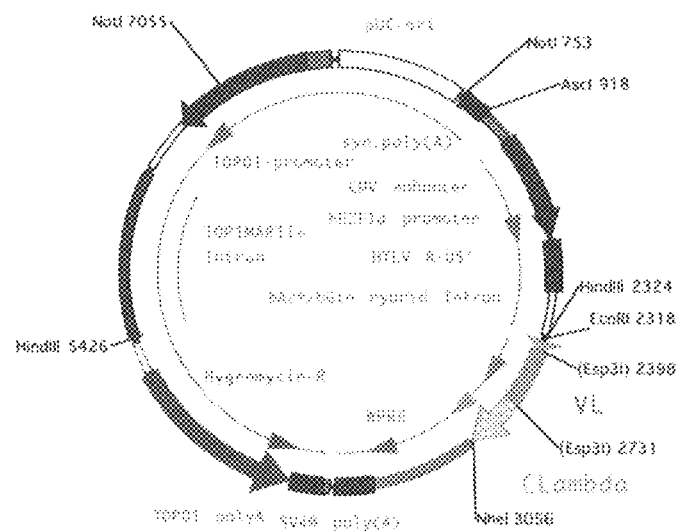

The following describes the present invention in more detail. The terms "comprising," "containing," and "including" used below also include the concepts of consisting essentially of and consisting of. The term "mass" can also be read as "weight."

1. Antibody

The antibody according to the present invention is a human-derived, monoclonal antibody that specifically recognizes the extracellular domain of human Cripto-1. The specific recognition of human Cripto-1 by the antibody according to the present invention does not mean that the antibody according to the present invention does not recognize homologs or orthologues of human Cripto-1 (i.e., selectively recognizing human Cripto-1) when homologs or orthologues of human Cripto-1 are present together with human Cripto-1 in the same system. Rather, this means that the antibody recognizes human Cripto-1 more strongly than these homologs or orthologues, or that the antibody has higher affinity for human Cripto-1 than for these homologs or orthologues. Thus, the term "specific" or "specifically" as used in the present invention is understood quite differently from the meaning of "selective" or "selectively."

The antibody according to the present invention contains at least one CDR selected from the group consisting of a heavy-chain CDR 1, a heavy-chain CDR 2, a light-chain CDR 1, and a light-chain CDR 2, which are formed from the amino acid sequences detailed below.

Heavy-chain CDR 1

The heavy-chain CDR 1 contained in the antibody according to the present invention contains any one of the following amino acid sequences (A) to (D).
  (A) The amino acid sequence represented by SEQ ID NO: 1.
  (B) An amino acid sequence formed by substituting, deleting, or adding 1 to 3 amino acid residues in the amino acid sequence (A).
  (C) The amino acid sequence represented by SEQ ID NO: 2.
  (D) An amino acid sequence formed by substituting, deleting, or adding 1 to 3 amino acid residues in the amino acid sequence (C).

The number of amino acid residues deleted, substituted, or added in the amino acid sequence (B) or (D) is not particularly limited as long as the antibody can specifically recognize the extracellular domain of human Cripto-1. The "substitution" is preferably a conservative substitution.

The phrase "conservative substitution" means the substitution of an amino acid residue with another amino acid residue having a similar side chain. For example, the substitution between amino acid residues having a basic side chain such as lysine, arginine, or histidine is considered to be a conservative substitution. The following substitutions between other amino acid residues are also considered to be a conservative substitution: the substitution between amino acid residues having an acidic side chain such as aspartic acid or glutamic acid; the substitution between amino acid residues having an uncharged polar side chain such as glycine, asparagine, glutamine, serine, threonine, tyrosine, or cysteine; the substitution between amino acid residues having a nonpolar side chain such as alanine, valine, leucine, isoleucine, proline, phenylalanine, methionine, or tryptophan; the substitution between amino acid residues having a β-branched side chain such as threonine, valine, or isoleucine; and the substitution between amino acid residues having an aromatic side chain such as tyrosine, phenylalanine, tryptophan, or histidine.

Heavy-chain CDR 2

The heavy-chain CDR 2 contained in the antibody according to the present invention contains any one of the following amino acid sequences (E) to (H).
  (E) The amino acid sequence represented by SEQ ID NO: 3.
  (F) An amino acid sequence formed by substituting, deleting, or adding 1 to 3 amino acid residues in the amino acid sequence (E).
  (G) The amino acid sequence represented by SEQ ID NO: 4.
  (H) An amino acid sequence formed by substituting, deleting, or adding 1 to 3 amino acid residues in the amino acid sequence (G).

The number of amino acid residues deleted, substituted, or added in the amino acid sequence (F) or (H) is not particularly limited as long as the antibody can specifically recognize the extracellular domain of human Cripto-1. The "substitution" is preferably a conservative substitution.

Light-chain CDR 1

The light-chain CDR 1 contained in the antibody according to the present invention contains the following amino acid sequence (I) or (J).
  (I) The amino acid sequence represented by SEQ ID NO: 7.
  (J) An amino acid sequence formed by substituting, deleting, or adding 1 to 3 amino acid residues in the amino acid sequence (I).

The number of amino acid residues deleted, substituted, or added in the amino acid sequence (J) is not particularly limited as long as the antibody can specifically recognize the extracellular domain of human Cripto-1. The "substitution" is preferably a conservative substitution.

Light-chain CDR 2

The light-chain CDR 2 contained in the antibody according to the present invention contains the following amino acid sequence (K) or (L).
  (K) The amino acid sequence represented by SEQ ID NO: 8.
  (L) An amino acid sequence formed by substituting, deleting, or adding 1 to 3 amino acid residues in the amino acid sequence (K).

The number of amino acid residues deleted, substituted, or added in the amino acid sequence (L) is not particularly limited as long as the antibody can specifically recognize the extracellular domain of human Cripto-1. The "substitution" is preferably a conservative substitution.

In a more preferable embodiment, the antibody according to the present invention further contains a heavy-chain CDR 3 or a light-chain CDR 3, or both the heavy-chain CDR 3 and the light-chain CDR 3. The heavy-chain CDR 3 contains the following amino acid sequence (M) or (N).

(M) The amino acid sequence represented by SEQ ID NO: 5.

(N) An amino acid sequence formed by substituting, deleting, or adding 1 to 3 amino acid residues in the amino acid sequence (M).

The number of amino acid residues deleted, substituted, or added in the amino acid sequence (N) is not particularly limited as long as the antibody can specifically recognize the extracellular domain of human Cripto-1. The "substitution" is preferably a conservative substitution.

The light-chain CDR 3 contains the following amino acid sequence (O) or (P).

(O) The amino acid sequence represented by SEQ ID NO: 9.

(P) An amino acid sequence formed by substituting, deleting, or adding 1 to 3 amino acid residues in the amino acid sequence (O).

The number of amino acid residues deleted, substituted, or added in the amino acid sequence (P) is not particularly limited as long as the antibody can specifically recognize the extracellular domain of human Cripto-1. The "substitution" is preferably a conservative substitution.

In a still more preferable embodiment, the antibody according to the present invention further contains a heavy-chain variable region or a light-chain variable region, or both the heavy-chain variable region and the light-chain variable region. The heavy-chain variable region contains the following amino acid sequence (Q) or (R).

(Q) The amino acid sequence represented by SEQ ID NO: 6.

(R) An amino acid sequence formed by substituting, deleting, or adding 1 to 50 amino acid residues in the amino acid sequence (Q).

The number of amino acid residues deleted, substituted, or added in the amino acid sequence (R) is not particularly limited as long as the antibody can specifically recognize the extracellular domain of human Cripto-1. For example, the number of amino acid residues deleted, substituted, or added in the amino acid sequence (R) is preferably 1 to 45, more preferably 1 to 40, 1 to 35, 1 to 30, 1 to 25, 1 to 20, 1 to 19, 1 to 18, 1 to 17, 1 to 16, 1 to 15, 1 to 14, 1 to 13, 1 to 12, 1 to 11, 1 to 10, 1 to 9, 1 to 8, 1 to 7, 1 to 6, 1 to 5, 1 to 4, or 1 to 3, and most preferably 1 to 2.

The amino acid residues deleted, substituted, or added in the heavy-chain variable region are preferably the amino acid residues of FR. The "substitution" is preferably a conservative substitution.

The light-chain variable region contains the following amino acid sequence(S) or (T).

(S) The amino acid sequence represented by SEQ ID NO: 10.

(T) An amino acid sequence formed by substituting, deleting, or adding 1 to 50 amino acid residues in the amino acid sequence (S).

The number of amino acid residues deleted, substituted, or added in the amino acid sequence(S) is not particularly limited as long as the antibody can specifically recognize the extracellular domain of human Cripto-1. For example, the number of amino acid residues deleted, substituted, or added is preferably 1 to 45, more preferably 1 to 40, 1 to 35, 1 to 30, 1 to 25, 1 to 20, 1 to 19, 1 to 18, 1 to 17, 1 to 16, 1 to 15, 1 to 14, 1 to 13, 1 to 12, 1 to 11, 1 to 10, 1 to 9, 1 to 8, 1 to 7, 1 to 6, 1 to 5, 1 to 4, or 1 to 3, and most preferably 1 to 2.

The amino acid residues deleted, substituted, or added in the light-chain variable region are preferably the amino acid residues of FR. The "substitution" is preferably a conservative substitution.

The structure of the antibody according to the present invention is not particularly limited as long as the antibody contains the amino acid sequences described above and specifically recognizes the extracellular domain of human Cripto-1. For example, the structure of the antibody includes Fv, scfv, diabody, triabody, and tetrabody. The antibody may also have a structure formed by any combination of these. An antibody having such a structure is also referred to as an antibody fragment.

The antibody according to the present invention may also contain a constant region. The origin of the constant region is not particularly limited as long as the antibody specifically recognizes the extracellular domain of human Cripto-1. Examples include animal species that can be mass-produced, animal species that are closely related to humans, and animal species that are unlikely to cause immunogenicity when the antibody is administered to humans. Specific examples of constant regions include human-derived constant regions, mouse-derived constant regions, rat-derived constant regions, rabbit-derived constant regions, donkey-derived constant regions, monkey-derived constant regions, and chimpanzee-derived constant regions.

The structure of the antibody containing such constant regions is not particularly limited as long as the antibody specifically recognizes the extracellular domain of human Cripto-1. Examples include immunoglobulins, Fab, $F(ab')_2$, minibody, and scfv-Fc. The structure of the antibody may also be an appropriate combination of these. An antibody having such a combination is also referred to as an "antibody fragment."

The subtype of the immunoglobulins is not particularly limited as long as the effects of the present invention are provided. Examples include IgM, IgD, IgG, IgA, and IgE. Of these, from the standpoint of providing greater effects of the present invention, IgG is preferable.

The subclass of IgG is not particularly limited as long as the effects of the present invention are provided. Examples include $IgG_1$, $IgG_2$, $IgG_3$, and $IgG_4$. From the standpoint of providing greater effects of the present invention, $IgG_1$ is preferable.

The antibody according to the present invention also includes antibodies having cytotoxic activity. The cytotoxic activity can be any activity that is toxic to target cells (e.g., cancer stem cells), and can specifically include an effect of causing such cells to die. The cytotoxic activity is not particularly limited as long as the effects of the present invention are provided. Specifically, the cytotoxic activity includes ADCC activity, CDC activity, and ADCP.

ADCC activity is an activity that is also referred to as "antibody-dependent cellular cytotoxicity." This activity is understood by those skilled in the art to be the activity in which an antibody recruits effector cells, such as macrophages, NK cells, neutrophils, or eosinophils, into its vicinity and causes damage through these effector cells to the cells adjacent to the antibody. The level of ADCC activity can be measured by known methods. Specifically, the level of ADCC activity can be measured, for example, by suitably modifying the method disclosed by Kimura M et al. in Cancer Science, August 2007, vol. 98, No. 8, 1275-1280.

ADCC activity is also measurable by using ADCC Reporter Bioassay (Promega). Another measuring method is performed, for example, by mixing a leukocyte fraction of blood with target cells to cause cytotoxicity and measuring the amount of LDH leak or converting the cytotoxicity to a value indicating cell survival activity by using WST-8 etc.

CDC activity is also referred to as "complement-dependent cytotoxicity." This activity is understood by those skilled in the art to be the activity in which an antibody recruits complements in its vicinity and causes damage through the complements to the cells adjacent to the antibody. The method for measuring the level of such CDC activity can be a known method. Specifically, ADCC activity can be measured by suitably modifying known methods described in the literature as described above. Specifically, ADCC activity can be measured by adding serum to cells and measuring the level of cytotoxicity caused by complements in the serum.

ADCP activity is also referred to as "antibody-dependent cellular phagocytosis." This activity is understood by those skilled in the art to be the activity in which an antibody recruits macrophages in its vicinity and causes the recruited macrophages to phagocytize the cells adjacent to the antibody. The method for measuring the level of such ADCP activity can be a known method.

The antibody according to the present invention may have a site capable of specifically recognizing one or more antigens other than human Cripto-1. In other words, the antibody according to the present invention may be a multispecific antibody. The antigens are not particularly limited as long as the antibody provides the effects of the present invention.

The antibody according to the present invention can also be used as a conjugate having a cytotoxin bound. The cytotoxin can be any cytotoxin. For example, the cytotoxin can be suitably selected from known cytotoxins capable of binding to antibodies as long as the effects of the invention are achieved. Specifically, examples of cytotoxins include emtansine (DM1), ozogamicin (calicheamicins), monomethyl auristatin E (MMAE), monomethyl auristatin F (MMAF), pyrrolobenzodiazepine (PBD), duocarmycins, amanitin (AAMT), adozelesin, bizelesin, carzelesin (U-80244), and PNU159682 (nemorubicins). The antibody according to the present invention can be readily produced by those skilled in the art by constructing an expression vector containing the polynucleotide according to the present invention, described later, by using conventional genetic engineering means and introducing the expression vector into a host cell or cell-free expression system suitable for antibody production. The produced antibodies can also be subjected to conventional purification processes as appropriate to make them highly pure.

The human-derived antibody according to the present invention is capable of specifically recognizing human Cripto-1. The antibody according to the present invention also exerts an inhibitory effect on the proliferation of cancer stem cells. Because cancer cells differentiate from cancer stem cells, the antibody according to the present invention exerts a preventive and/or therapeutic effect on cancer. The composition according to the invention can thus be used, for example, in the field of food and beverage or medical drugs in expectation of such an effect.

2. Polynucleotide

The polynucleotide according to the present invention has the base sequence encoding the antibody according to the present invention. The polynucleotide is not particularly limited. For example, the polynucleotide can be a deoxyribonucleotide, a ribonucleotide, a nucleic acid peptide, or a known modified product of these. The polynucleotide may be a single-stranded polynucleotide or a double-stranded polynucleotide.

The base sequence of the polynucleotide can be determined, for example, in silico by those skilled in the art based on the amino acid sequence of the above antibody. The codons for use in determining the base sequence can be of any type. It is preferable to determine the base sequence in consideration of the codon frequency of the host with which the polynucleotide is used.

The polynucleotide according to the present invention can also be contained in various vectors. Such vectors are not particularly limited. Examples of vectors include expression vectors and cloning vectors.

3. Cell

The cell according to the present invention produces the antibody according to the present invention. The production of the antibody may be intracellular or extracellular (secretory) production.

The cell according to the present invention preferably retains the polynucleotide according to the present invention. The term "retain" means that the cell keeps the polynucleotide according to the present invention in its inside, and that the cell does not take the polynucleotide out of the cell irrespective of whether actively or passively.

The cell according to the present invention can be selected from known cells suitable for antibody production and is not particularly limited. Examples of cells include prokaryotic cells such as *Escherichia coli* and actinomycete, and eukaryotic cells such as yeast cells, insect cells, and mammal cells.

4. Food or Beverage Composition

The active ingredient contained in the food or beverage composition according to the present invention is the human-derived anti-human Cripto-1 monoclonal antibody that specifically recognizes the extracellular domain of human Cripto-1 described above.

The amount of the active ingredient contained in the food or beverage composition according to the present invention is not particularly limited as long as the effects of the present invention are provided. Specifically, the content of the active ingredient can be about 0.001 to 100 mass % based on the food or beverage composition taken as 100 mass %.

The food or beverage composition according to the present invention includes food with health claims (including beverages) such as foods for specified health use, foods with function claims, and foods with nutrient function claims; diet supplementary foods, dietary supplements, and nutritionally adjusted foods; and foods in general (including beverages). The food or beverage composition according to the present invention also includes feed such as livestock feed, farmed fish feed, and pet animal feed (e.g., pet food). These food or beverage compositions may be in the form of conventional food or beverages; for example, these food or beverage compositions can be in the form of general foods or beverages (apparent food), or in the form of foods for specified health use or foods with function claims indicating the effect of suppressing the induction of stem cells into cancer stem cells as functionality of the food or beverages. Specifically, the food or beverage composition according to the present invention can state, for example, that the composition helps to reduce cancer cells, helps to reduce cancer stem cells, helps to slow the progression of cancer cells, helps to slow the progression of cancer stem cells, or helps to reduce cancer stem cells to thereby slow the progression of cancer.

The form of the food or beverage composition according to the present invention is not particularly limited as long as the effects of the present invention are provided. Examples include drinks such as soft drinks, carbonated drinks, energy drinks, fruit drinks, and lactic acid drinks; frozen desserts such as ice cream, and shaved ice; sweets such as gum, chocolate, candies, tablets, snacks, jellies, jams, cream, and gummy candies; noodles such as buckwheat noodles, udon noodles, instant noodles, and Chinese noodles; fishery or livestock processed foods such as kamaboko (steamed fish paste), ham, and sausages; dairy products such as processed milk, and fermented milk; oil and fat or processed oil-and-fat food products such as salad oil, mayonnaise, whipped cream, and dressings; seasonings such as sauces and liquid seasonings; soup, salad, prepared foods, pickles, breads, and cereals.

The food or beverage composition according to the present invention can also be, for example, in the form of formulations commonly provided as supplements, including solid preparations (e.g., powder, granules, capsules, troches, and tablets) and liquid preparations (e.g., syrup and drink).

The food or beverage composition according to the present invention can be ingested by any living organism that carries stem cells that can be induced into cancer stem cells, and that desires the suppression of induction of stem cells into cancer stem cells.

Examples of living organisms include humans; domestic animals such as cow, swine, boars, sheep, horses, goats, donkeys, bears, reindeer, rabbits, reindeer, and frogs; poultry, such as chickens, ducks, geese, turkeys, Muscovy ducks, quails, ostriches, pigeons, pheasants, wild ducks, and cormorant birds; farmed marine products such as fish, crustaceans, and mollusks; breeding insects such as bees and silkworms; and pet animals such as dogs, cats, rodents, rabbits, monkeys, pigs, parrots, parakeets, snakes, alligators, turtles, salamanders, ornamental fish (e.g., goldfish, and tropical fish), beetles, stag beetles, spiders, and scorpions.

The intake of the food or beverage composition according to the present invention can be set as appropriate, for example, according to the gender and age of the target, the application form of the food or beverage composition, and the extent of the effects desired, and is not particularly limited. For example, a mouse with a body weight of 50 g can take the food or beverage composition according to the present invention in an amount of about 1 pmol to 1 µmol on an active ingredient basis daily. The intake of the composition for targets other than mice can be set as appropriate based on this numerical range, taking the target body weight etc. into consideration.

The interval at which the food or beverage composition according to the present invention is ingested can also be set as appropriate, for example, according to the gender and age of the target, the application form of the food or beverage composition, and the extent of the effects desired, and is not particularly limited. For example, the food or beverage composition according to the present invention may be taken once a day, or multiple times (e.g., two to three times) at intervals a day. The food or beverage composition can also be taken at intervals of a few days or a few weeks.

5. Pharmaceutical Composition

The active ingredient of the pharmaceutical composition according to the present invention is the human-derived anti-human Cripto-1 monoclonal antibody that specifically recognizes the extracellular domain of human Cripto-1 descried above.

The amount of the active ingredient contained in the pharmaceutical composition according to the present invention is not particularly limited as long as the effects of the present invention are provided. Specifically, the content of the active ingredient can be about 0.001 to 100 mass based on the pharmaceutical composition taken as 100 mass %.

The pharmaceutical composition according to the present invention can be produced by combining the active ingredient with a known pharmaceutically acceptable carrier or additives used in the manufacture of compositions in the pharmaceutical field. The carrier or additives are not particularly limited as long as the effects of the present invention are provided. Examples include any carriers, diluents, excipients, suspending agents, lubricants, adjuvants, media, delivery systems, emulsifiers, tablet-degrading substances, absorbents, preservatives, surfactants, colorants, flavoring agents, and sweeteners.

The pharmaceutical composition according to the present invention can be of various dosage forms prepared by adding the carrier or additives described above as appropriate. Thus, the dosage form of the pharmaceutical composition according to the present invention is not particularly limited as long as the effects of the present invention are provided. Specifically, the dosage forms include injections such as parenteral infusions, implantable injections, microneedles, and persistent injections; dialysis products such as peritoneal dialysis agents and hemodialysis agents; capsules such as hard or soft capsules; oral tablets such as syrups, oral jelly, lozenges, sublingual tablets, buccal tablets, adherent tablets, and gum preparations; inhalants such as oral sprays, oral semi-solid preparations, mouthwashes, inhalation powder, inhalation liquid, and inhalation aerosol; eye drops such as eye ointments; ear drops; and nasal preparations such as nasal powder and nasal liquid.

The method for administering the pharmaceutical composition according to the present invention is not particularly limited as long as the method is a known administration method optimized for each of the dosage forms described above. Specifically, the method for administration includes intramuscular administration, intravenous administration, intra-arterial administration, subarachnoid administration, intradermal administration, intraperitoneal administration, intranasal administration, intrapulmonary administration, intraocular administration, vaginal administration, intra-cervical administration, rectal administration, and subcutaneous administration.

The target of administration of the pharmaceutical composition according to the present invention is not particularly limited as long as the target is a living organism that carries stem cells that can be induced into cancer stem cells (a living organism at risk of developing cancer), and that desires the suppression of induction of stem cells into cancer stem cells (a living organism that desires the prevention and/or treatment of cancer). Specifically, the target can be the same as the target to be given the food or beverage composition described above.

The dose of the pharmaceutical composition according to the present invention is not particularly limited as long as the effects of the present invention are provided. Specifically, the dose of the pharmaceutical composition can be set as appropriate, for example, according to the gender and age of the target, the application form of the pharmaceutical composition, or the extent of the effects desired. For example, a mouse with a body weight of 50 g can take the pharmaceutical composition according to the present invention in an amount of about 1 pmol to 1 µmol on an active ingredient basis daily. The dose of the pharmaceutical composition for targets other than mice can be set as appropriate based on this numerical range taking the target body weight etc. into consideration.

The interval at which the pharmaceutical composition according to the present invention is administered can also be set as appropriate, for example, according to the gender and age of the target, the application form of the pharmaceutical composition, and the extent of the effects desired, and is not particularly limited. For example, the pharmaceutical composition according to the present invention may be administered once a day, or multiple times (e.g., two to three times) at intervals a day. The composition can also be administered at intervals of a few days or a few weeks.

6. Method for Prevention and/or Treatment

The prevention method according to the present invention is a method for preventing cancer including administering a human-derived anti-human monoclonal antibody that specifically recognizes the extracellular domain of human Cripto-1 to a living organism that desires the prevention of developing cancer.

The treatment method according to the present invention is a method for treating cancer including administering a human-derived anti-human monoclonal antibody that specifically recognizes the extracellular domain of human Cripto-1 to a living organism that has developed cancer.

For the human-derived anti-human monoclonal antibody that specifically recognizes the extracellular domain of human Cripto-1, the "1. Antibody" section above can be referred to.

For specific prevention or treatment methods according to the present invention, the "1. Antibody," "4. Food or Beverage Composition," and "5. Pharmaceutical Composition" sections above can be referred to.

EXAMPLES

The following gives Examples to describe the present invention in more detail. The present invention is not limited to the inventions described in the following Examples.

Example 1: Screening for Anti-human Cripto-1 Antibody

A phage-displayed human antibody library was screened for antibodies that specifically recognize the extracellular domain of human Cripto-1. The extracellular domain of human Cripto-1 contains the amino acid sequence represented by SEQ ID NO: 11, and has a His-tag sequence having the amino acid sequence represented by SEQ ID NO: 12 at its N-terminus. The extracellular domain of human Cripto-1 was prepared in its soluble form in accordance with the method disclosed in Alam. et. al., Int J Mol Sci. 2018, 26; 19 (11). The antibody library used as a screening target is described in Sakai, K. et al., Biochemistry 46 (1): 253-62, and the subclass of the antibody is IgG.

As a result, a phage strain of #35 clone was obtained as an antibody that specifically recognizes the extracellular domain of purified human Cripto-1. The base sequence encoding the antibody was analyzed based on this clone, and the amino acid sequences of the variable regions of the heavy chain and light chain of the antibody were analyzed based on the results by using IgBlast (www.ncbi.nlm.nih.gov) and Vbase2 (www.vbase2.org). Table 1 below shows the results. The two amino acid sequences shown for VH-CDR1 or VH-CDR2 indicate that the amino acid sequence of VH-CDR1 or VH-CDR2 can be either of them.

TABLE 1

| \<Clone #35\> | |
|---|---|
| VH-CDR1 | GNSVSSNSAA (SEQ ID NO: 1) |
| | SVSSNSAAWN (SEQ ID NO: 2) |
| VH-CDR2 | TYYRSKWYN (SEQ ID NO: 3) |
| | YRSKWYN (SEQ ID NO: 4) |
| VH-CDR3 | ARGFCSGGRCYSFDY (SEQ ID: No. 5) |
| VH (SEQ ID NO: 6) | QVQLQQSGPGLVKPSQTLSLTCAISGNSVSSNSAAWNWIRRSPSRGLEWLGR TYYRSKWYNDYAVSVKSRITIKPDTSKNQFSLQLNSVTPEDTAMYYCARGFC SGGRCYSFDYWGPGTLVTVSSGSASAPTAS |
| VL-CDR1 | DSDVGAYGS (SEQ ID NO: 7) |
| VL-CDR2 | DVT (SEQ ID NO: 8) |
| VL-CDR3 | QAWDSGIHVVF (SEQ ID NO: 9) |
| VL (SEQ ID NO: 10) | QSVLTQPASVSGSPGQSITISCTGTDSDVGAYGSASWYRHSPGKAPQLIIYD VTNRPSGVSNRFYGSKSGNTASLTISGLQAEDEADYYCQAWDSGIHVVFGGG TQLTVLG |

Figure 2:
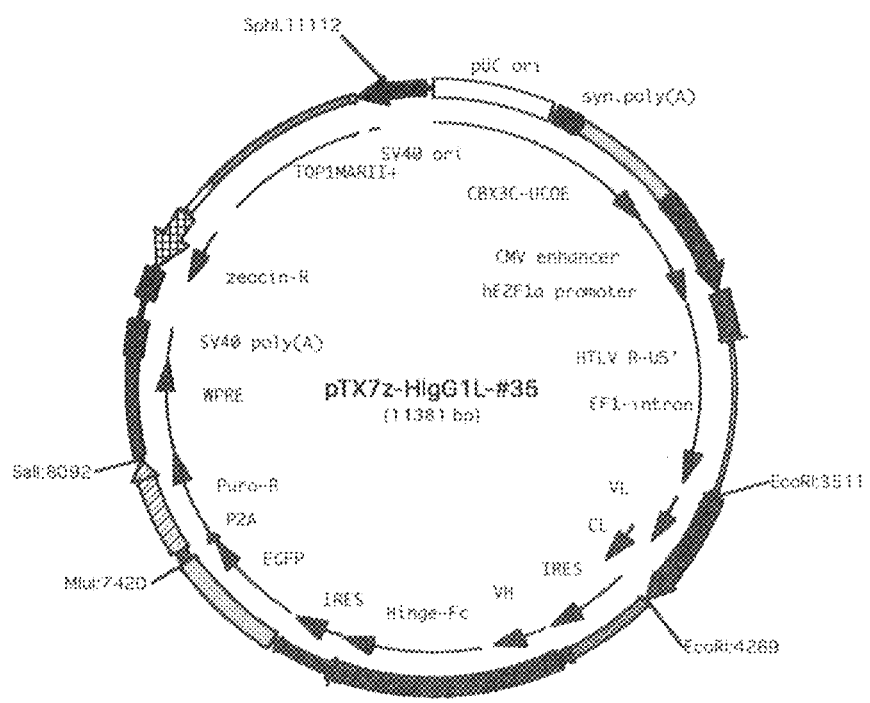
FIG. 2 shows a schematic diagram of an expression vector constructed during the preparation of antibodies of various clones produced in Example 1. The VH and VL in FIG. 2 are the same as those in FIG. 1.

To obtain this antibody, the base sequences encoding the heavy-chain variable region and light-chain variable region of #35 clone were incorporated into vectors for antibody expression, thereby preparing a pHIGH5zeo vector, a pHIgL5hyg vector, and a pTX7z-HigG1L- #35 vector (FIGS. 1 and 2). These vectors were transiently introduced into CHO cells to allow the cells to secrete #35 clone antibody. Finally, the antibody was purified from the culture supernatant of CHO cells according to a standard method by using a Protein A column, and the solvent was replaced with Dulbecco's physiological phosphate buffer.

Example 2: Evaluation of Antigen Recognition Ability by ELISA

Figure 3:
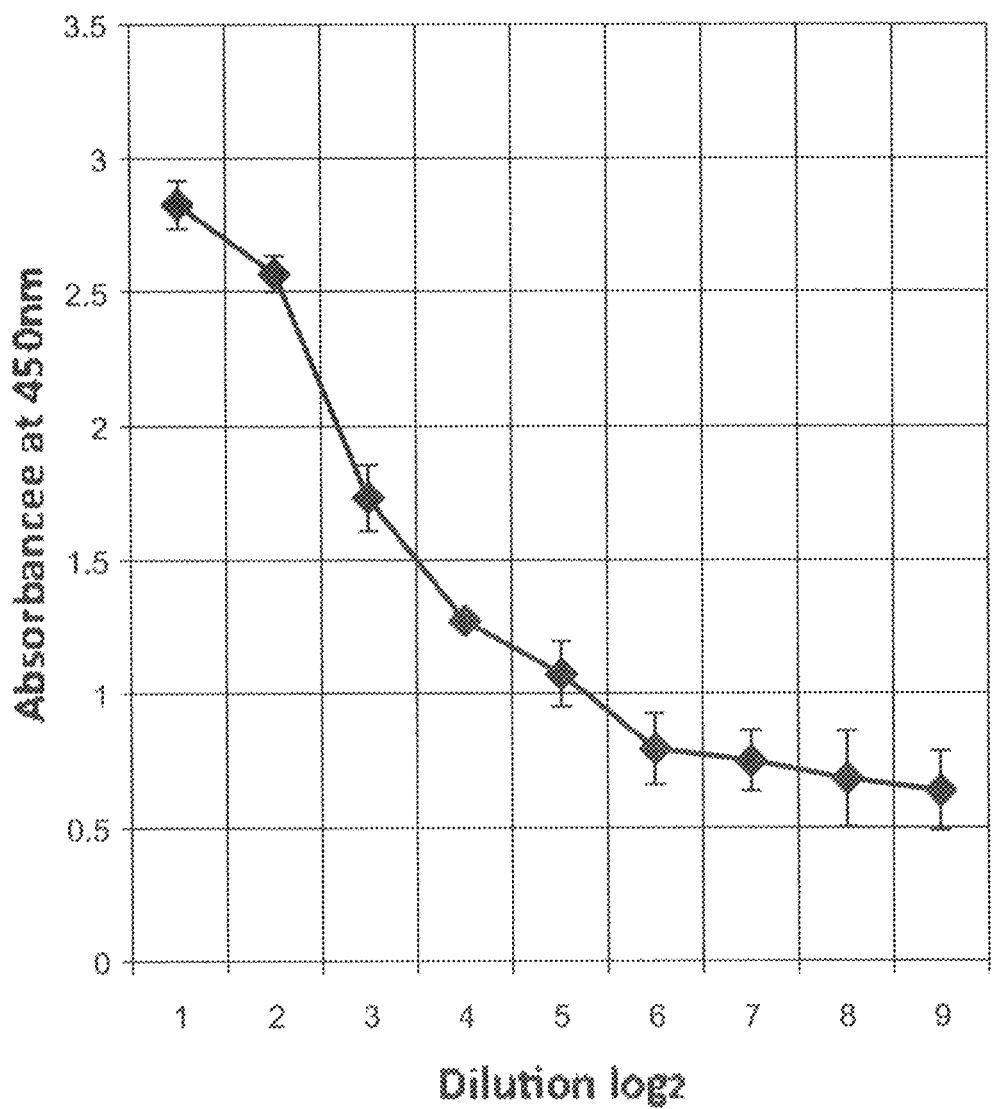
FIG. 3 shows the experimental results in Example 2. The vertical axis of the graph shows the absorbance at 570 nm, which indicates the degree of coloration of HPR. The horizontal axis shows the number of 2-fold dilutions of the culture supernatant of #35 clone added to wells. The number of dilutions increases as the number increases.

The culture supernatant of the #35 clone antibody was collected and diluted 25-fold with a phosphate buffer, further followed by performing continuous dilution every 2-fold. The diluted culture supernatant was added to a 96-well plate, and IgG molecules (human-derived anti-human Cripto-1 antibody) adsorbed on each well were detected with an HRP-labeled anti-human IgG goat antibody (produced by Abcam). FIG. 3 shows the results.

As shown in FIG. 3, the coloring due to HRP is decreased with the degree of the dilution of the culture supernatant containing the #35 clone antibody. This indicates that the #35 clone antibody specifically adsorbed on its antigen, human Cripto-1.

Figure 4:
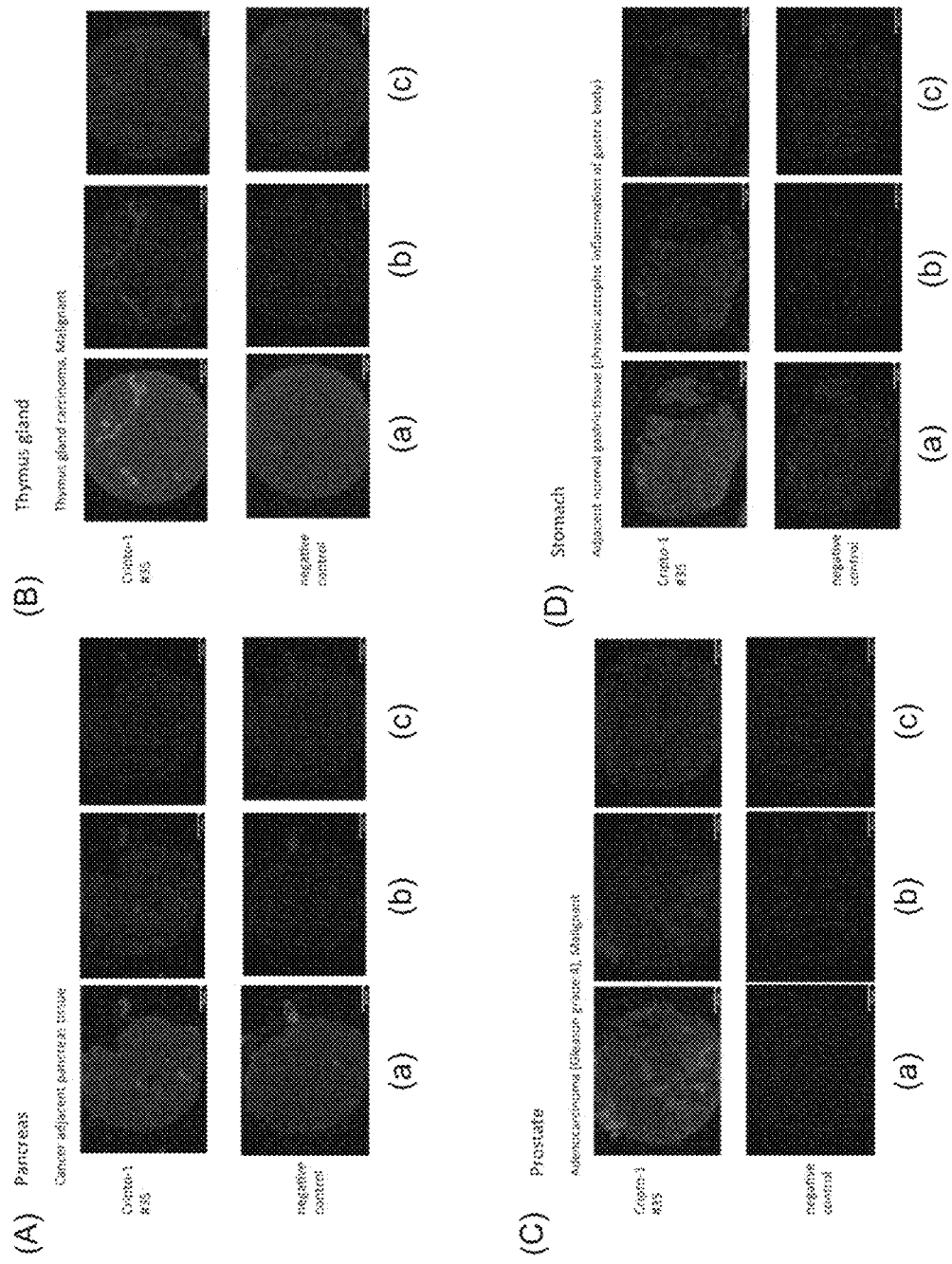
FIG. 4 shows the experimental results in Example 3.
Figure 5:
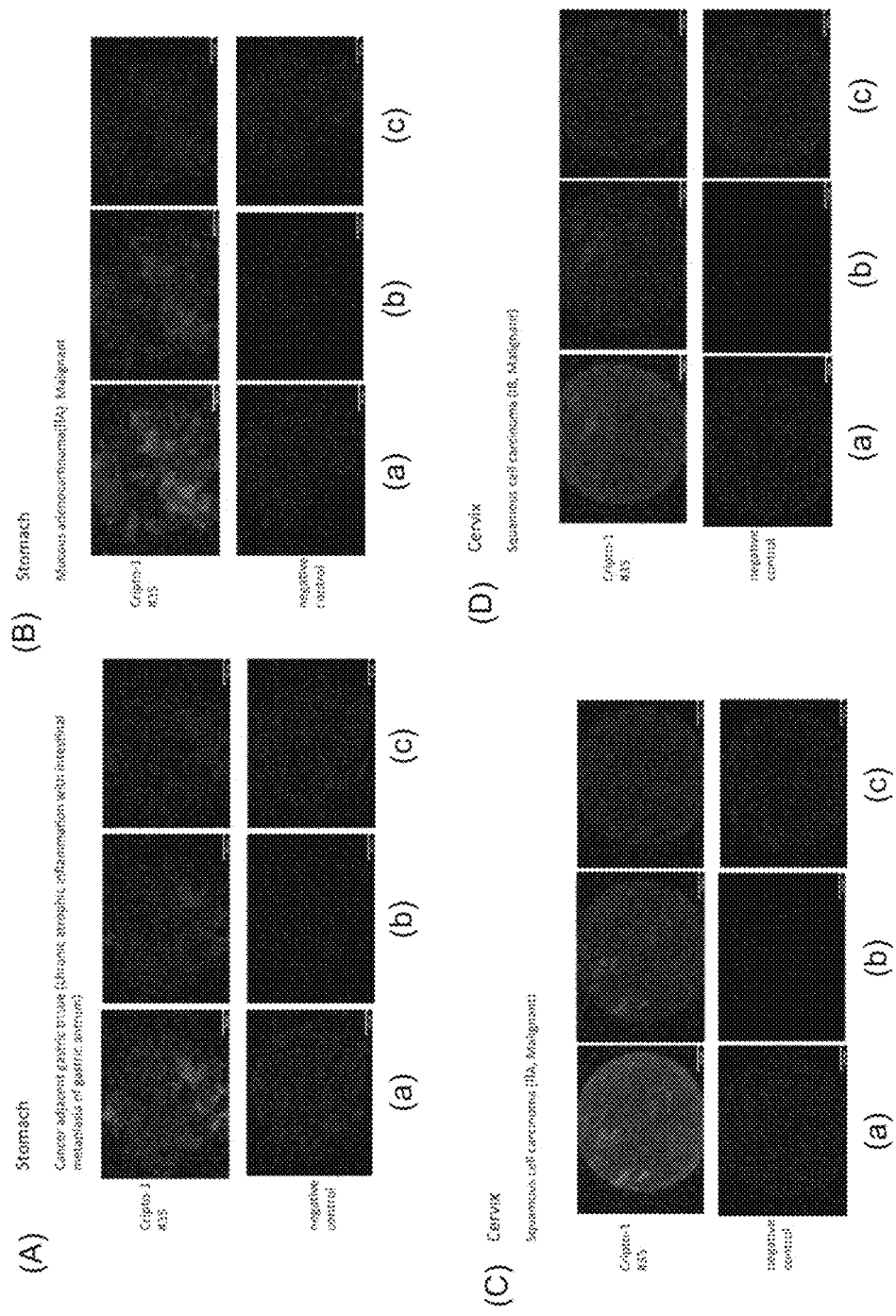
FIG. 5 shows the experimental results in Example 3.
Figure 6:
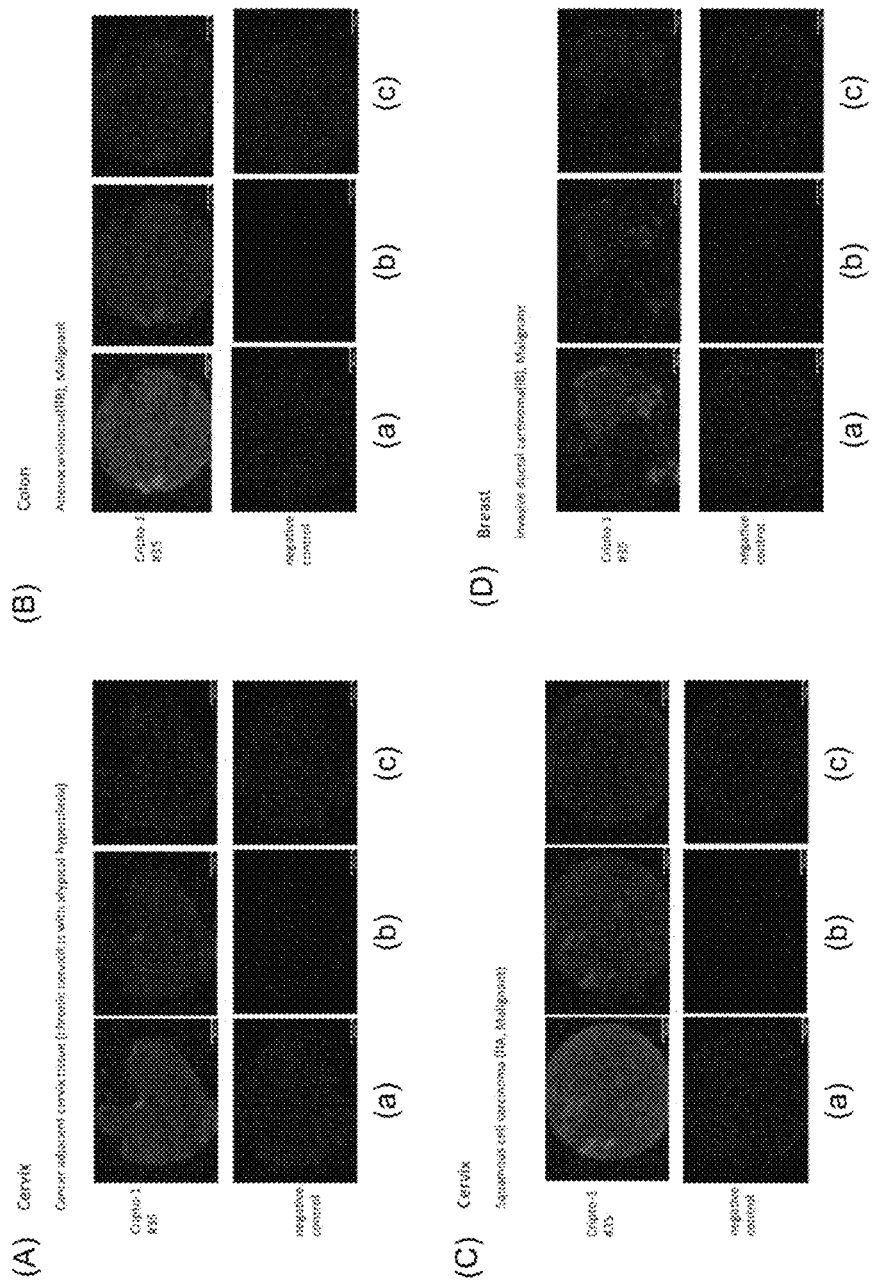
FIG. 6 shows the experimental results in Example 3.

Example 3: Evaluation of Specificity to (Human) Cancer Tissue Using Tissue Array Immunostaining was performed on a human cancer tissue array (BCN801, US Biomax Inc.). The #35 clone was used as a primary antibody. ALEXA568-labeled anti-human IgG goat antibody (Invitrogen) was used as a secondary antibody to detect human Cripto-1 in each cancer tissue (pancreas cancer tissue, thyroid gland cancer tissue, prostate cancer tissue, stomach cancer tissue, cervical cancer tissue, colorectal cancer tissue, and breast cancer tissue). These tissues contained cancer stem cells as well as cancer cells, and Cripto-1 was thought to be bound to the surface of the cell membrane of the cancer stem cells by GPI-anchors. In a negative control experiment, the signal background was confirmed by using only the secondary antibody. FIGS. 4 to 6 show the results.

As shown in FIGS. 4 to 6, staining images by the #35 clone antibody were confirmed in all of the cancer tissues.

Example 4: Effect of Antibody on Cancer Stem Cell

The effect on the proliferation of cancer stem cells was evaluated by using 3-(4,5-dimethylthiazol-2-yl)-2,5-diphenyltetrazolium bromide (MTT). The U251MG SC1 cells used as cancer stem cells were prepared by the method described below.

U251MG cells (brain tumor cell) obtained from the ECACC (European Collection of Authenticated Cell Cultures) were subcutaneously transplanted into nude mice (BALB/c-nu/nu, female) to form a tumor. Subsequently, the tumor was harvested and cultured according to a standard method. The tumor cells were screened with cells that grow hyaluronic-acid-dependently as a reference, thereby obtaining U251MG SC1 cells.

Figure 7:
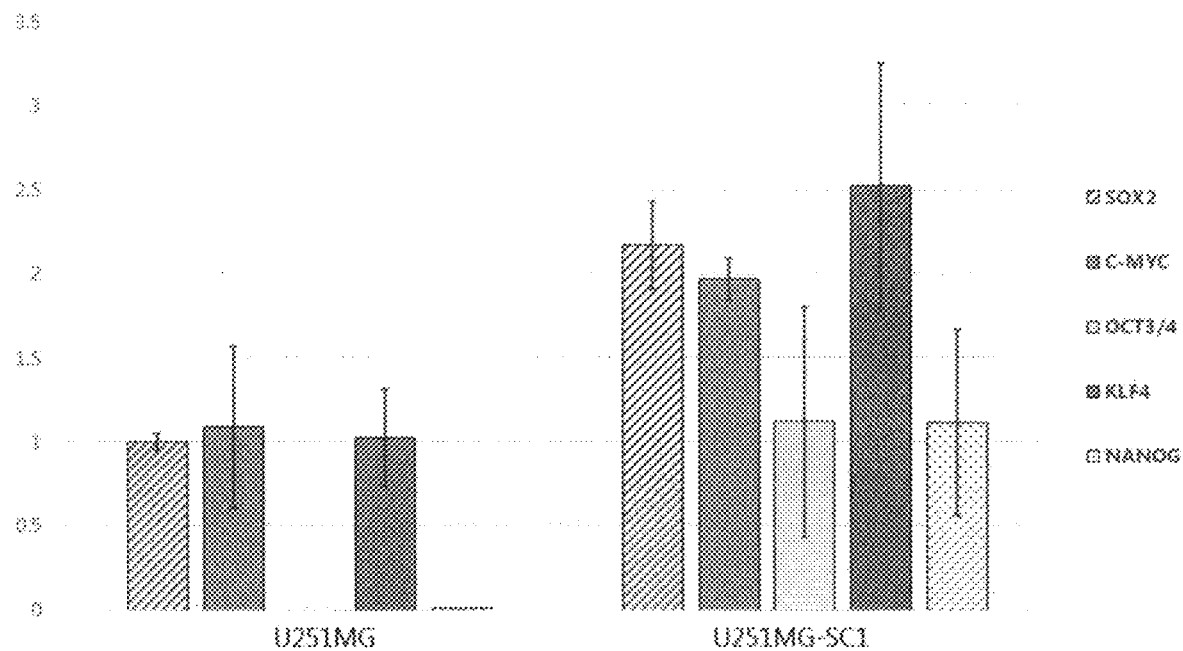
FIG. 7 shows the experimental results (quantitative PCR) in Example 4. The vertical axis in FIG. 7 shows the expression levels of cancer stem cell markers (SOX2, c-Myc, OCT3/4, KLF4, and NANOG) relative to GAPDH.

To confirm the cancer stem cell property of the thus-obtained U251MG SC1 cell lines, an experiment to confirm the expression of SOX2, c-Myc, OCT3/4, KLF4, and NANOG genes was performed by quantification PCR using probes that recognize individual genes in accordance with a standard method. Table 2 below shows the base sequences of the probes that recognize individual genes used in quantitative PCR. GAPDH was used as an internal standard. FIG. 7 shows the results.

TABLE 2

| 遺伝子名 | | 塩基配列 (5'→3') |
|---|---|---|
| GAPDH | F | CAACGACCACTTTGTCAAGCTC (配列番号 13) |
| | R | GGTCTACATGGCAACTGTGAGG (配列番号 14) |
| SOX2 | F | GGGAAATGGGAGGGGTGCAAAAGAGG (配列番号 15) |
| | R | TTGCGTGAGTGTGGATGGGATTGGTG (配列番号 16) |
| c-Myc | F | GCGTCCTGGGAAGGGAGATCCGGAGC (配列番号 17) |
| | R | TTGAGGGCATCGTCGCGCGGGAGGCTG (配列番号 18) |
| OCT3/4 | F | GACAGGGGAGGGGAGGAGCTAGG (配列番号 19) |
| | R | CTTCCCTCCAACCAGTTGCCCCAAAC (配列番号 20) |
| KLF4 | F | ATGCTCACCCCACCTTCTTC (配列番号 21) |
| | R | TTCTCACCTGTGTGGGTTCG (配列番号 22) |
| NANOG | F | CAGCCCCGATTCTTCCACCAGTCCC (配列番号 23) |
| | R | CGGAAGATTCCCAGTCGGGTTCACC (配列番号 24) |

As shown in FIG. 7, whereas the expression of OCT3/4 and NANOG was not detected in U251MG cells before screening, the expression of all of the SOX2, c-Myc, OCT3/4, KLF4, and NANOG genes was confirmed in U251MG SC1 cells obtained after screening. This clarified that U251MG SC1 cells obtained by screening U251MG cells were cell lines having a cancer stem cell property.

Subsequently, an MTT assay was performed to confirm the inhibitory effect of the #35 clone antibody on self-renewal potential (proliferation) of the U251MG SC1 cells obtained by screening.

Figure 8:
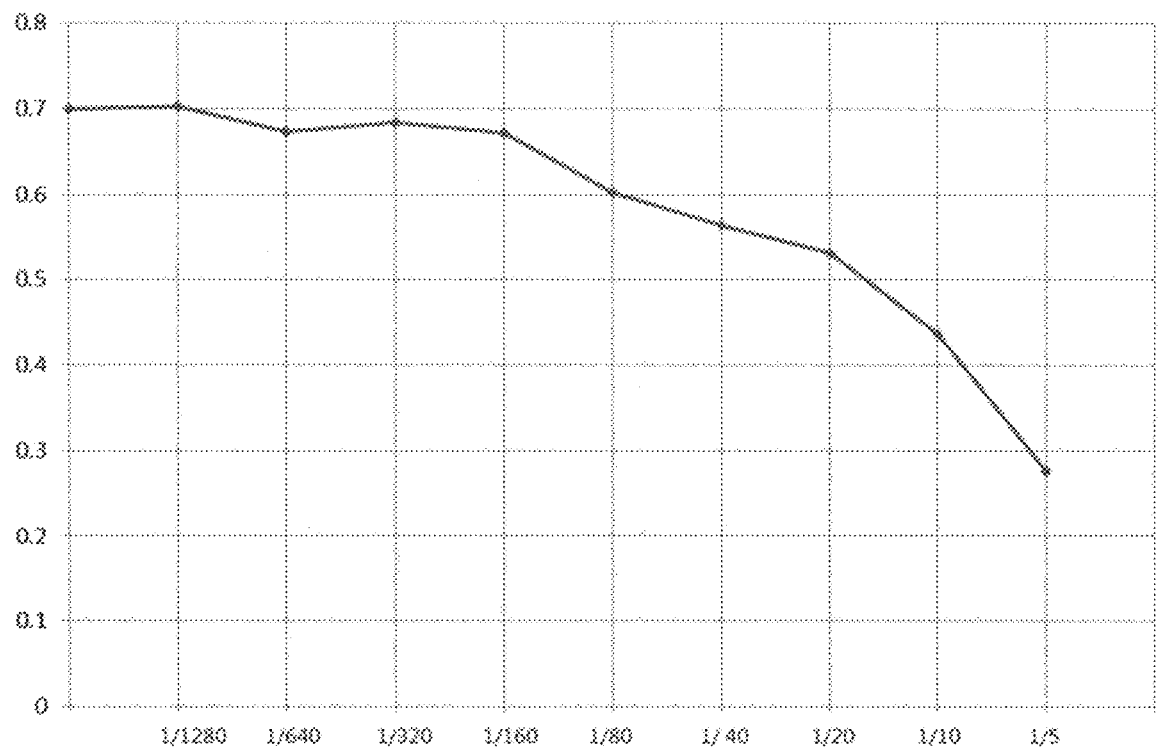
FIG. 8 shows the experimental results (MTT assay) in Example 4. The vertical axis in FIG. 8 shows the expression levels of SOX2, c-Myc, OCT3/4, KLF4, and NANOG relative to GAPDH at 570 nm.

First, cells suspended in DMEM or RPMI1640 containing 10% fetal bovine serum were seeded into a 96-well plate at $5 \times 10^3$ cells/well. After culturing for 24 hours in 5% $CO_2$ at 37° C., a solution of the #35 clone antibody subjected to serial dilution was added to each well, and the culturing was continued for another 72 hours. Then, MTT dissolved in PBS at 5 mg/mL was added to give a final concentration of 1 mg/ml. After 4 hours of culturing, the formed formazan was dissolved in 0.02N HCl, and 10% w/v SDS was added, followed by dissolution at 37° C. for a day and night. The absorbance of this solution at 570 nm was measured to evaluate the cell viability. FIG. 8 shows the results.

As shown in FIG. 8, the results revealed that the growth of U251MG SC1 cell lines obtained as cancer stem cells by screening U251MG was inhibited in the presence of the #35 clone antibody, and that the growth was inhibited greater with the increase in concentration of the #35 clone antibody. This clarified that the #35 clone antibody exhibits an effect in inhibiting the proliferation of cancer stem cells.

Cancer stem cells are known to form spheres when cultured in a non-adhesive environment, such as in a low-adsorption dish. Thus, in order to confirm the effect of the #35 clone antibody in inhibiting the proliferation of cancer stem cells, an experiment to measure the number of spheres of cancer stem cells was performed with reference to the method disclosed in FIG. 4A of NPL 4. The specifically used cancer stem cells were NTERA2 clone D1 (EACC strain number: 01071221). The experiment to measure the number of spheres by using these cells also clarified that as shown in FIG. 8, the #35 clone antibody exhibited an effect in inhibiting the proliferation of cancer stem cells (data not shown).

The invention claimed is:

1. An anti-human Cripto-1 monoclonal antibody that specifically recognizes the extracellular domain of human Cripto-1, wherein the antibody comprises:
 a heavy-chain complementarity determining region (CDR) 1 comprising the amino acid sequence of SEQ ID NO: 1 or SEQ ID NO: 2;
 a heavy-chain CDR 2 comprising the amino acid sequence of SEQ ID NO: 3 or SEQ ID NO: 4;
 a heavy-chain CDR3 comprising the amino acid sequence of SEQ ID NO: 5;
 a light-chain CDR 1 comprising the amino acid sequence of SEQ ID NO: 7;
 a light-chain CDR2 comprising the amino acid sequence of SEQ ID NO: 8; and
 a light-chain CDR 3 comprising the amino acid sequence of SEQ ID NO: 9.

2. The antibody according to claim 1, comprised of a heavy-chain variable region comprising the amino acid sequence of SEQ ID NO: 6 or an amino acid sequence formed by substituting, deleting, or adding 1 to 50 amino acid residues of framework region (FR) of SEQ ID NO: 6 and a light-chain variable region comprising the amino acid sequence of SEQ ID NO: 10 or an amino acid sequence formed by substituting, deleting, or adding 1 to 50 amino acid residues of FR of SEQ ID NO: 10.

3. The antibody according to claim 1, having a structure of Fv fragment, scfv, diabody, triabody, tetrabody, or a combination thereof.

4. The antibody according to claim 1, comprising a constant region.

5. The antibody according to claim 1, having a structure of an immunoglobulin, Fab, F(ab')$_2$, minibody, scfv-Fc, or a combination thereof.

6. The antibody according to claim 1, having cytotoxic activity.

7. The antibody according to claim 6, wherein the cytotoxic activity is antibody-dependent cellular cytotoxicity (ADCC), complement-dependent cytotoxicity (CDC), or antibody-dependent cellular phagocytosis (ADCP) activity.

8. The antibody according to claim 1, to which a cytotoxin is bindable.

9. A polynucleotide encoding the antibody of claim 1.

10. A cell producing the antibody of claim 1.

11. A cell retaining the polynucleotide of claim 9.

12. A food or beverage composition comprising the antibody of claim 1.

13. A pharmaceutical composition comprising the antibody of claim 1.

* * * * *